United States Patent [19]

Smith

[11] 4,419,113

[45] Dec. 6, 1983

[54] DIESEL EXHAUST PARTICULATE TRAP WITH AXIALLY STACKED FILTERS

[75] Inventor: Richard H. Smith, Birmingham, Mich.

[73] Assignee: General Motors Corporation, Detroit, Mich.

[21] Appl. No.: 396,357

[22] Filed: Jul. 8, 1982

[51] Int. Cl.³ .............................. B01D 46/02
[52] U.S. Cl. ................ 55/484; 55/DIG. 30; 55/DIG. 10; 60/311; 422/197
[58] Field of Search .............. 55/482, 484, 489, 510, 55/523, 526, 385 B, DIG. 30, DIG. 10; 60/311; 422/180, 196, 197; 210/323.2, 340, 345

[56] References Cited

U.S. PATENT DOCUMENTS 3,864,109  2/1975  Hansen .................. 55/484
4,343,631  8/1982  Ciliberti ................ 55/484

FOREIGN PATENT DOCUMENTS 674283  4/1939  Fed. Rep. of Germany ....... 55/510
917274  1/1963  United Kingdom ............ 55/484

*Primary Examiner*—David L. Lacey
*Attorney, Agent, or Firm*—Arthur N. Krein

[57] ABSTRACT

An elongated particulate trap to fit the area usually occupied by the vertical cylindrical muffler, as on a large diesel truck, consists of rings of axial flow filter elements and a disc-like axial flow end filter element stacked in a trap housing, having an exhaust inlet and outlet at opposite ends, so as to provide a central flow passage for entry of exhaust gases via the exhaust inlet and so as to define with the trap housing and exhaust passage in flow communication with the exhaust outlet. The filter elements are stacked in spaced apart relationship to each other whereby to provide an axial gap therebetween to allow radial flow on one face of the filter elements. The axial gaps are sealed alternately on inner and outer radial ends to define outlet and inlet passages, respectively and to force axial flow through the filter elements whereby particulates will be removed from the exhaust gases.

3 Claims, 4 Drawing Figures

DIESEL EXHAUST PARTICULATE TRAP WITH AXIALLY STACKED FILTERS

BACKGROUND OF THE INVENTION

This invention relates to diesel engine exhaust treatment systems, and, in particular, to a particulate trap with axially stacked filters for use in such systems on diesel engine powered trucks or similar vehicles.

DESCRIPTION OF THE PRIOR ART

It is known in the art to provide a diesel engine with an exhaust treatment system that includes one or more particulate traps or filters that are operative to filter out and collect particulates from the exhaust gas stream discharged from the engine. Such particulates consists largely of carbon particles that tend to plug the filter, thus restricting exhaust gas flow therethrough. Accordingly, after continued use of such a system for a period of time dependent on engine operation, it becomes desirable to effect regeneration of the particulate filter.

Restoration or regeneration of such a particulate filter has been accomplished by the use of a suitable auxiliary burner device. For example, an air-fuel nozzle and an ignition device can be used and operated, when desired, to heat the particulate filter to the combustion temperature of the collected particulates so as to burn them off the filter surfaces and, accordingly, to thus reopen the flow paths therethrough to again permit normal flow of the exhaust gases through that filter.

To date, such exhaust treatment systems have been proposed for use primarily on small diesel engines, for example, up to 5.7 liter engines as used in passenger vehicles, because in such prior systems the effective area of the filter medium due to the configurations of the associate filter traps has been restricted. Accordingly, unless such prior particulate filter traps were almost constantly being subjected to regeneration they could not be readily used with larger size diesel engines, for example, engines larger than 5.7 liters, as used on large trucks or similar type vehicles.

SUMMARY OF THE INVENTION

Accordingly, a primary object of the invention is to provide an improved diesel exhaust particulate trap for use in the exhaust treatment systems of large sized diesel engines of the type used in trucks or similar large sized vehicles, the particulate trap having a plurality of axially stacked, axial flow filters arranged therein whereby to remove particulates from the exhaust gas discharged from the associate engine.

Another object of the invention is to provide an improved diesel particulate trap, for use in the exhaust cleaner system of a diesel engine, having a plurality of axial flow particulate filter cartridges axially arranged in spaced apart relationship to each other in a trap housing whereby to define exhaust inlet and outlet passages for the flow of exhaust gas adjacent to opposite faces of each filter cartridge.

For a better understanding of the invention, as well as other objects and further features thereof, reference is had to the following detailed description of the invention to be read in connection with the accompanying drawings.

BRIEF DESCRIPTION OF THE DRAWING

FIG. 3 is a sectional view taken along line 3—3 of FIG. 2 to show the lower end of a filter cartridge and its mounting arrangement within a trap housing; and, FIG. 4 is a sectional view taken along line 4—4 of FIG. 2 of the lower intermediate end of a filter cartridge of the trap assembly.

DESCRIPTION OF A PREFERRED EMBODIMENT

Figure 1:
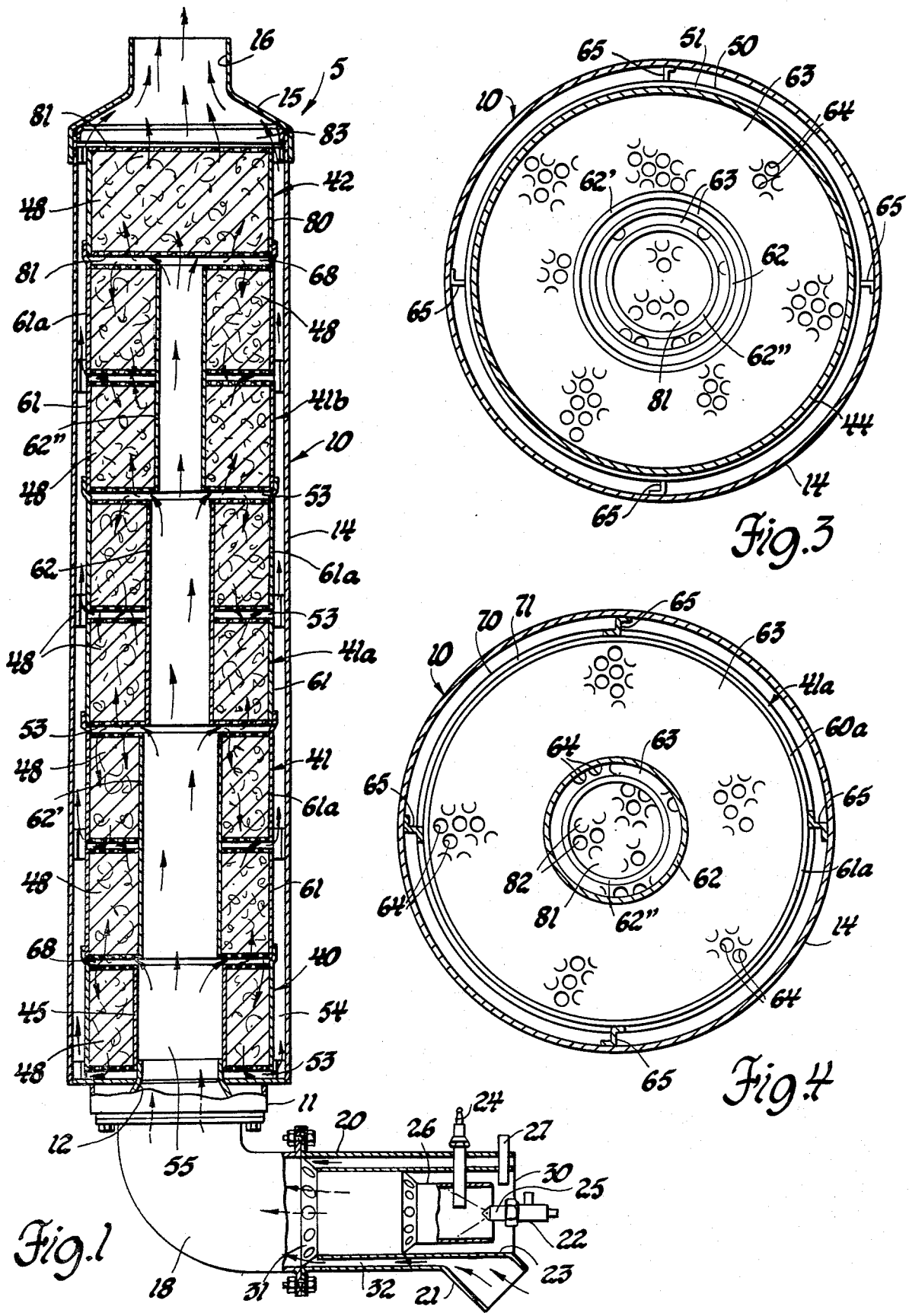
FIG. 1 is a schematic sectional view of a diesel exhaust cleaner system having a diesel exhaust particulate trap with axially stacked filters, in accordance with the invention, for use with a diesel truck or similar vehicle.

Referring first to FIG. 1, there is illustrated a single path exhaust cleaner system, generally designated by reference numeral 5, for use on a diesel truck or similar vehicle, the embodiment shown being sized and arranged so as to replace a vertically positioned, cylindrical exhaust muffler as presently used on such vehicles. This exhaust cleaner system is adapted to be secured, as to the cab of the truck, by suitable clamps, not shown, in a manner similar to that presently used to retain an exhaust muffler.

The exhaust cleaner system 5, in the construction illustrated in FIG. 1, includes an exhaust cleaner trap 10, having an intake section 11 with an exhaust inlet 12, an intermediate, elongated cylindrical housing 14 and, a discharge section 15 with exhaust outlet 16, these elements being suitably secured together with a plurality of particulate filters, in accordance with the invention, to be described in detail hereinafter, positioned in the housing 14.

The exhaust inlet 12 of the intake section 11 is adapted to be suitably connected so as to receive exhaust gas discharged from an associate diesel engine and also, in the construction shown, for connection to a suitable heater means used to raise the temperature of particulates trapped within the exhaust cleaner trap 10 to their combustion temperature. For this purpose, in the construction shown, the exhaust inlet 12 of the intake section 11 is suitably connected by means of an elbow duct 18 to an intake manifold duct 20 having a side branch duct 21 extending therefrom which serves as an inlet duct for exhaust gas and, which is adapted to be connected, in a suitable known manner, so as to receive the exhaust gas discharged from an associate diesel engine, not shown.

In the embodiment shown, the heater means includes an air-fuel mixing and atomizing burner assembly 22 operatively positioned in a burner housing 23 concentrically mounted within the intake manifold duct 20. This burner assembly 22 is capable of supplying an atomized combustible air-fuel mixture to the interior of the burner housing 23 and thus via the duct 18 to the exhaust inlet 12 of the exhaust cleaner trap.

The atomizing burner assembly 22, in the construction shown, includes a conventional fuel nozzle 25, which may be of the air atomizing type as shown, and which is positioned so that its discharge spray type end projects into an apertured burner hood 26. This burner hood 26 is suitably supported concentrically within the burner housing 23. A suitable electric igniter 24, such as a spark plug or glow plug, is also operatively mounted to extend through the inlet manifold duct 20, burner housing 23 and into the burner hood 26 for igniting the air-fuel mixture supplied by the burner assembly 22.

If desired and as shown in FIG. 1, a small amount of additional air may be supplied to the atomizing burner assembly 22 by means of an air inlet tube 27 that projects through the inlet manifold duct 20 and burner housing 23 and which is adapted to be connected at its outboard end to a suitable source of air, as from an air pump, not shown, which may be engine driven or which may be in the form of an electrical air pump.

In the construction illustrated, the burner housing 23 is fixed at one end, as by welding to the outboard end wall 30, the right hand wall, with reference to FIG. 1, of the intake manifold duct 20, and at its other end it is concentrically supported in this duct 20 by means of an apertured hood 31. With this arrangement, the exterior of the burner housing 23 defines with the internal cylindrical wall of the manifold duct 20, a passage 32 in the form of annulus, for the flow of exhaust gases received through the side branch 21.

The operational control of the burner assembly and of the electric igniter 24 can be accomplished, for example, in a known manner by means of an electronic control unit, which in a conventional manner, receive input signals of various engine operating conditions and a suitable signal indicating the pressure differential existing across the trap during engine operation, as sensed by a suitable pressure differential gauge, not shown, which would be operatively connected with both the inlet and outlet ends of the trap whereby to measure the pressure drop across the filters to be described next in detail herein.

Now in accordance with a feature of the invention, the exhaust cleaner trap 10 is adapted to house therein a plurality of axial flow particulate filters, which with reference to the construction illustrated, includes, in succession starting from the bottom, an inlet filter 40, at least one intermediate filter assembly 41, three such filter assemblies 41, 41a and 41b being used in the construction shown, and an end filter 42, all of which are to be described in detail hereinafter. For ease in manufacturing, the housing 14 and accordingly, each of the filters are of circular configuration although, it will be apparent that both the housing 14 and associate filters could be made in any suitable configuration, as desired.

Each of the filters 40 and 42, in the construction illustrated, is a cartridge type filter, that is, each such filter includes a cartridge housing supporting therein a suitable filter medium, such as, for example, a ceramic coated wire mesh material while, the filter assemblies 41, 41a and 41b are each, in effect, a unitary assembly of two filter cartridge housings, each supporting a filter medium, such as a ceramic coated wire mesh material therein.

Figure 2:
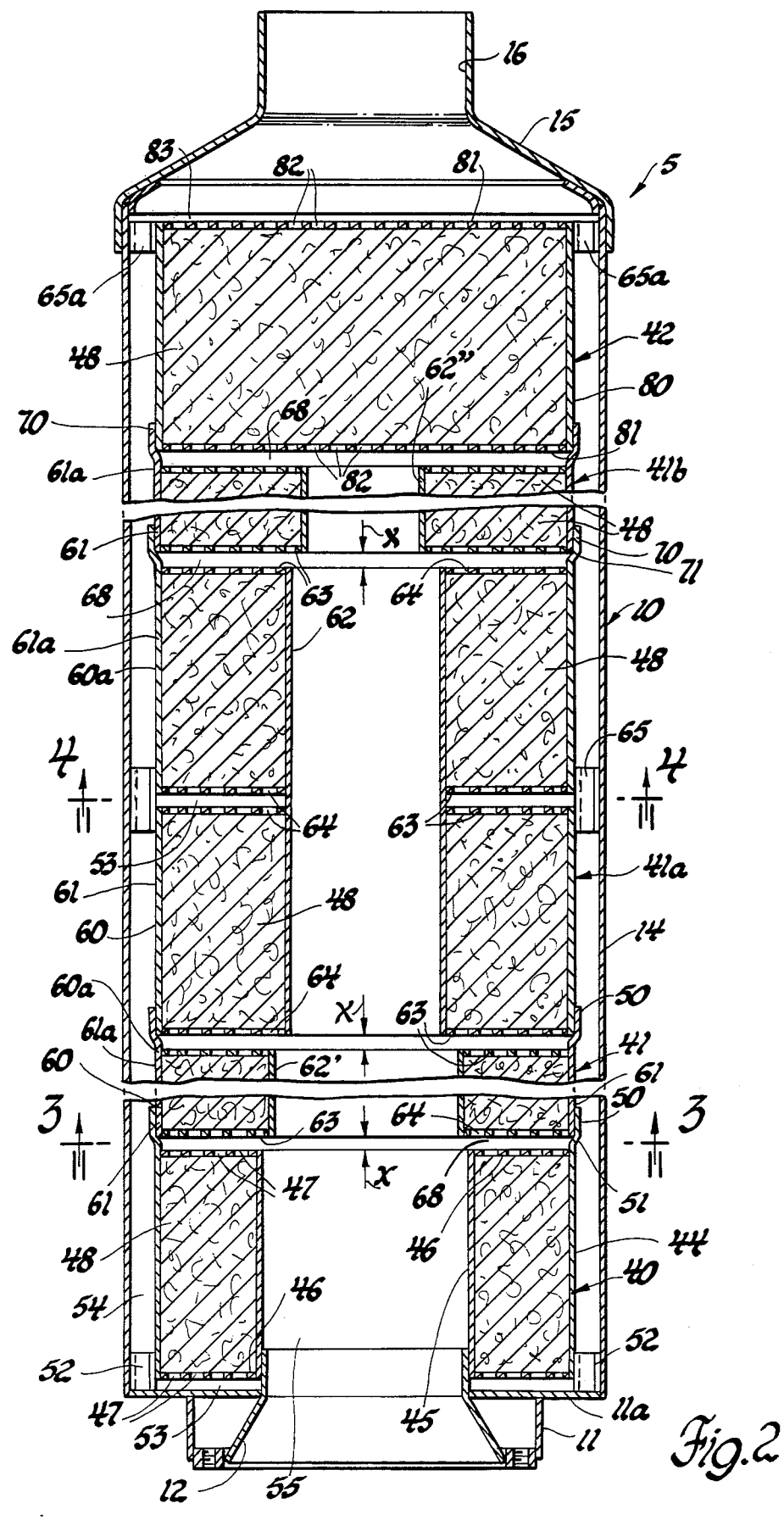
FIG. 2 is an enlarged sectional view of a portion of the particulate trap, per se, of FIG. 1.

Referring now first to the inlet filter 40, and, as best seen in FIG. 2, it includes a circular outer rim 44 and a circular inner hub 45, both of sheet metal and of predetermined axial extent. The outer rim 44 and inner hub 45 are interconnected at opposite ends by closure plates 46, each of which has a plurality of spaced apart apertures 47 therethrough, which preferably are in a random pattern. As thus secured together, the outer rim 44, inner hub 45 and closure plates 46 define a ring-like chamber for supporting a suitable particulate filter media, such as a ceramic fiber coated metal wire mesh material 48.

As best seen in FIG. 2, the outer rim 44 of the filter cartridge 40 has a main body portion of a predetermined external nominal diameter through most of its axial extent, but at its upper end, it is formed so as to have an annular circular flange 50 of an inside diameter corresponding to the outside diameter of the main body portion. This flange 50 is thus sized so as to slidably and telescopically receive the lower end of the next adjacent upper filter, that is to receive the lower filter element of filter assembly 41. A shoulder 51 connects the flange 50 to the main body of outer rim 44, and is located a predetermined spaced distance above the upper closure plate 46, for a purpose to be described hereinafter.

The filter 40 is located concentrically within the housing 14 and in axial spaced apart relationship, a predetermined distance, relative to the upper wall 11a inlet section 11 by means of a plurality of spacer supports 52 suitably secured, as by welding, to the lower exterior end of the outer rim 44 so as to be in circumferentially equally spaced apart relationship to each other. In the embodiment shown, four such spacer supports 52 are used, although only two are shown in FIG. 2.

The spacer supports 52, which, in the construction shown, are of Z-shape, are used to support this filter 40 in axial spaced apart relationship to the internal upper wall 11a, with reference to FIG. 2, of the intake section 11 to define therewith a radial extending outlet passage 53 and, to position this filter in radial spaced apart relationship to the interior wall of the housing 14 so as to define therewith an axial extending, annulus like, discharge passage 54.

In the construction shown, the inner hub 45, as best seen in FIG. 2, is of an internal diameter so as to slidably and telescopically receive the tubular, reduced diameter inboard end of the exhaust inlet 12 so as to form an exhaust inlet passage 55.

Referring now to the intermediate filter assemblies 41, 41a, and 41b, each of these filter assemblies is preferably of similar construction and, since only the filter assembly 41a is shown in detail in FIG. 2, only this filter assembly will be described in detail herein. Filter assembly 41a, like the filter assemblies 41 and 41b, consists of a unitary assembly of two filled filter cartridges 60 and 60a having separate outer rims 61 and 61a, respectively, and a common inner hub 62, with these elements being interconnected by closure plates 63, each of which has a plurality of spaced apart apertures 64 therethrough in a manner similar to those described hereinabove in regard to the apertures 47 in the closure plates 46. As shown in FIG. 2, two such closure plates 63 are fixed to opposite ends of the outer rim 61 and another two are fixed to opposite ends of the outer rim 61a and, all four such closure plates 63 encircling the inner hub 62 are fixed to this hub, as by welding.

Preferably, and as best seen in FIG. 2, the outer rim 61 and the major portion of rim 61a are of the same axial extent as the effective axial extent of the outer rim 44 of the filter 40. As shown, the upper outer rim 61a of this intermediate filter is also provided with an enlarged diameter annular rim 70 and, an interconnecting shoulder 71 similar to the rim 50 and shoulder 51, respectively, of outer rim 44 of filter 40. The axial extent of the inner hub 62 of the filter assembly 41a is equal to the total axial extent of the outer rims 61 and 61a plus a predetermined axial distance X, see FIGS. 1 and 2, whereby to define a radial extending outlet passage 53 between the opposed faces of the filters 60 and 60a as defined by the upper and lower closure plates 63, respectively, of these filters.

In order to maintain the outer rims 61 and 61a in axial spaced apart relationship to each other by the distance X and so as to maintain a concentric positioning of the intermediate filter assembly 41a within the housing 14, a plurality of Z-shaped spacer supports 65, as best seen in FIG. 4, are secured, as by welding, to the adjacent ends of the outer rims 61 and 61a in circumferential equally spaced apart relationship to each other.

Each of the filter cartridges 60 and 60a defines a ring-like chamber filled with a particulate filter media, such as the ceramic fiber coated metal wire mesh 48.

As previously described and as best seen in FIG. 2, the intermediate filter assemblies 41 and 41b are of the same construction as the intermediate filter assembly 41a and, accordingly, it is not deemed necessary to describe the construction of the filter assemblies 41a and 41b in detail herein. Each of the filter assemblies 41 and 41b is also provided with the spacer supports 65 for the same purpose as described with reference to filter assembly 41a.

However, as shown in FIGS. 1 and 2, the inner hubs 62', 62 and 62" of the intermediate filter assemblies 41, 41a and 41b, respectively are, preferably, of decreasing internal diameter relative to the internal diameter of the inner hub 45 of the inlet filter 40 whereby to define an axial extending inlet exhaust passage 55 of decreasing cross sectional flow area.

As best seen in FIG. 2, the lower outer rim 61 of the intermediate filter assembly 41 is of suitable external diameter whereby it is slidably and telescopically received by the annular flange 50 of the inlet filter 40 so that the lower edge of this outer rim 61 will abut against the shoulder 51. As thus positioned, the opposed faces of the inlet filter 40 and of the lower cartridge of the intermediate filter assembly 41 are held in axial spaced apart relationship to each other a distance X so as to define a radial extending inlet passage 68 therebetween.

As should now be apparent, the intermediate filter assembly 41a is stacked on top of the filter assembly 41 and, the filter assembly 41b on top of the filter assembly 41a, in the same manner described hereinabove with regard to the filter 40 and filter assembly 41, whereby these filters define radial inlet passages 68 within the exhaust cleaner trap 10. As thus stacked, these filters also define continuations of the axial extending exhaust inlet passage 55 and of the exhaust discharge passage 54 previously described, see FIGS. 1 and 2.

Referring now to the upper or end filter 42, it includes, as best seen in FIG. 2, an outer rim 80, similar to the rims 61 of filter assemblies 41, 41a and 41b and a pair of circular disc-like, closure plates 81, with plural perforations 82 extending therethrough. The closure plates 81 are secured, as by welding, at their outer peripheral edges to opposite ends of the outer rim 80 so as to define with this rim a circular chamber filled with a suitable particulate filter material 48, such as a ceramic fiber coated wire mesh material.

The bottom end of the outer rim 80 of this filter 42 is slidably and telescopically received by the circular flange 70 on the outer rim 61a of the next adjacent intermediate filter assembly, that is, of the upper intermediate filter assembly 41b, in the construction shown, to define therewith a radial inlet passage 68 between the opposed faces of these cartridges.

To aid in maintaining the end filter cartridge 42 located concentrically within the housing 14, a plurality of spacer supports 65a are suitably secured, as by welding, to the upper outer peripheral end surface of the outer rim 80 in circumferential spaced apart relationship to each other. The end filter 42 thus defines with the interior surface of the housing 14 a part of the exhaust discharge passage 54.

as illustrated, each of the filters, that is filter 40; the two filters of intermediate filter assemblies 41, 41a and 41b; and the filter 42, is, in effect, an axial flow type particulate filter element. These filter elements, in accordance with the invention, are stacked in spaced apart relationship to each other within the exhaust cleaner trap 10 so as to define alternating radial outlet and inlet passages 53 and 68, respectively.

The axial extent of these stacked filter 40; filter assemblies 41; 41a; 41b; and, filter 42 is preselected relative to the internal axial extent of the exhaust filter trap 10 so that a radial outlet passage 53 is provided between the lower face of the inlet filter 40 and the intake section 11, as previously described, and so that there is provided a radial extending exhaust passage 83 between the upper face of the end filter 42 and the internal flared end wall of the discharge section 15. As shown in FIGS. 1 and 2, this latter passage 83 is, in effect, in flow communication with both the axial extending discharge passage 54 and the exhaust outlet 16 passage of the discharge section 15.

Thus with the structure described and illustrated, there is provided an arrangement whereby a plurality of axial flow filters can be stacked so as to provide a composite filter structure having increased filter area, as compared to prior known filter structures.

While the invention has been described with reference to a particular embodiment disclosed herein, it is not confined to the details set forth since it is apparent that various modifications can be made by those skilled in the art without departing from the scope of the invention. For example, although the trap assembly is shown for mounting substantially, vertically, such trap could be mounted on a vehicle in any position, including a horizontal position, if desired. In addition, although a ceramic fiber wire mesh material has been used as the filter medium, it should be apparent that any suitable filter could be used in lieu of the material described. This application is therefore intended to cover such modifications or changes as may come within the purposes of the invention as defined by the following claims.

The embodiments of the invention in which an exclusive property or privilege is claimed as defined as follows:

1. A particulate trap for use in removing particulates from the exhaust gas discharged from a diesel engine, said trap including an elongated tubular housing having an exhaust inlet at one end connectable to an engine and an exhaust outlet at its other end, a plurality of axial flow filter means supported in said housing to define therewith a central axial extending inlet passage in flow communication at one end with said exhaust inlet and closed by one of said filter means at the opposite end adjacent to said outlet, said filter means being stacked and positioned in said housing whereby the outer peripheral surfaces of said filter means defines with said housing an annular outlet passage in flow communication at one end with said exhaust outlet and whereby to define an alternating series of first radial passages in flow communication with said inlet passage and second radial passages in flow communcation with said outlet passage between adjacent pairs of said filter means so that exhaust gas entering said housing via said exhaust inlet will flow into said inlet passage and then via one of said first radial passages into and axially through an associate said filter means, whereby particulates are removed, the exhaust gas then flowing via an associate said second radial passage to the said outlet passage for discharge out through the exhaust outlet.

2. A particulate trap for use in removing particulates from the exhaust gas discharged from a diesel engine, said trap including an elongated tubular housing having an exhaust inlet at one end connectable to an engine and an exhaust outlet at its other end; a plurality of axial flow filters, including a plurality of ring-like filters and an end filter, supported and stacked in spaced apart relationship to each other in said housing so that outer peripheral surfaces of said filters define with said housing an annular outlet passage in flow communication at one end with said outlet, said ring-like filters defining an axial extending inner inlet passage in flow communication at one end with said exhaust inlet and closed at its opposite end adjacent to said outlet by said end filter, and said filters being positioned and arranged to define an alternating series of first radial passages in flow communication with said inlet passage and second radial passages in flow communication with said outlet passage between adjacent pairs of said filters so that exhaust gas entering said housing via said exhaust inlet will flow into said inlet passage and then via one of said first radial passages into and axially through an associate said filter to an associate said second radial passage and then to the said outlet passage for discharge out through the outlet, the particulates in the exhaust gas being removed from the exhaust gas as it flows axially through a said filter.

3. A particulate trap for use in removing particulates from the exhaust gas discharged from a diesel engine, said trap including an elongated tubular housing having an exhaust inlet at one end connectable to an engine and an exhaust outlet at its other end, a first ring-like canister means containing filter material, at least one ring-like double canister means each containing filter material and an annular disc-like canister means containing filter material supported and stacked in spaced apart relationship to each other in said housing so that outer peripheral surfaces of all of said canister means define with said housing an annular outlet passage in flow communication at one end with said outlet and whereby said ring-like canister means define a central axial extending inlet passage in flow communication at one end with said exhaust inlet and closed at its opposite end adjacent to said exhaust outlet by said disc-like canister means and, whereby to define an alternating series of first radial passages in flow communication with said inlet passage and second radial passages in flow communication with said outlet passage between adjacent pairs of all of said canister means so that exhaust gas entering said housing via said exhaust inlet will flow into said inlet passage and then via one of said first radial passages into and axially through the filter material, whereby particulates are removed, the exhaust gas then flows to an associate said second radial passage via said outlet passage for discharge out through the exhaust outlet.

* * * * *